(No Model.) 2 Sheets—Sheet 1.
D. H. WILSON.
ELECTRIC FENCE.
No. 343,939. Patented June 15, 1886.
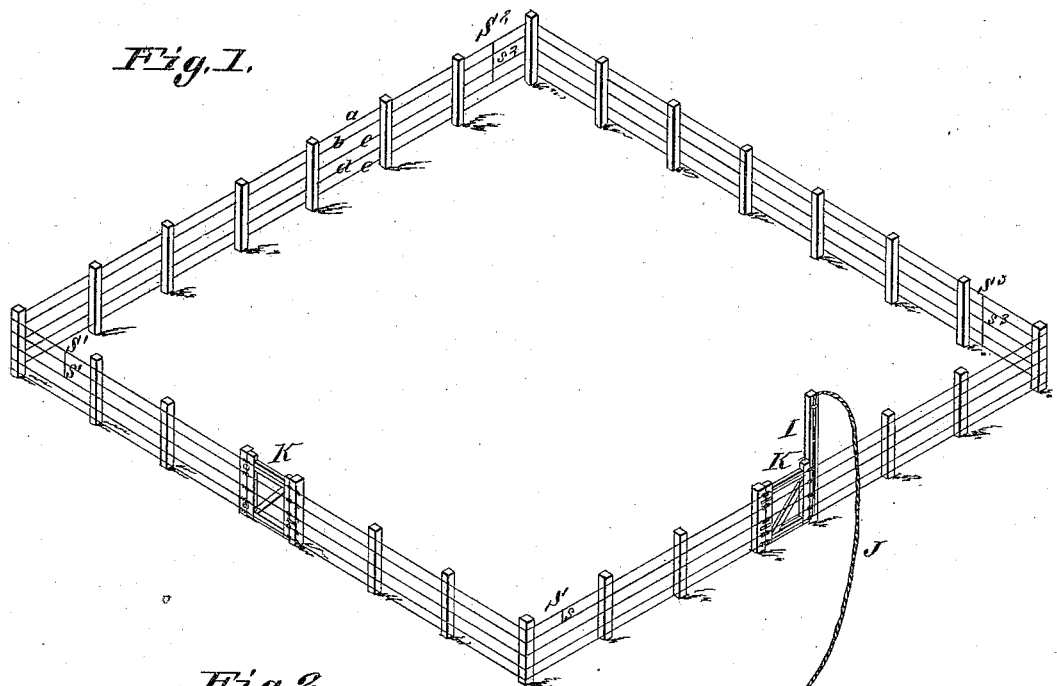
Fig. 1.
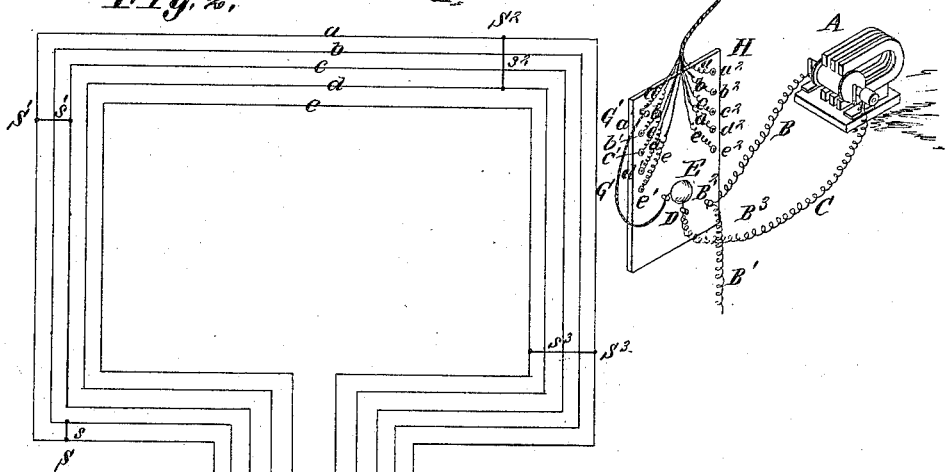
Fig. 2.
Attest:
F. As. Lipkins
A. E. Trumbull
Inventor:
David H. Wilson
By Knight Bro.
Attys.
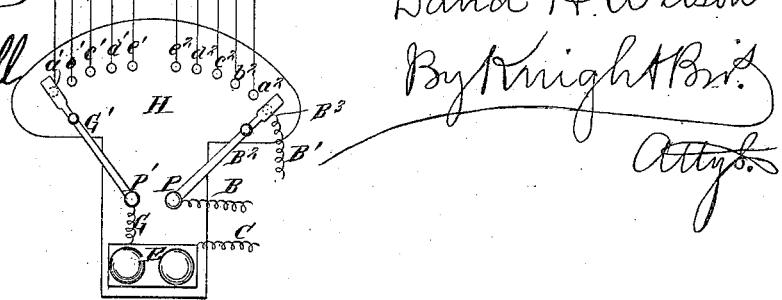
N. PETERS. Photo-Lithographer. Washington. D. C.

(No Model.) 2 Sheets—Sheet 2.
D. H. WILSON.
ELECTRIC FENCE.
No. 343,939. Patented June 15, 1886.
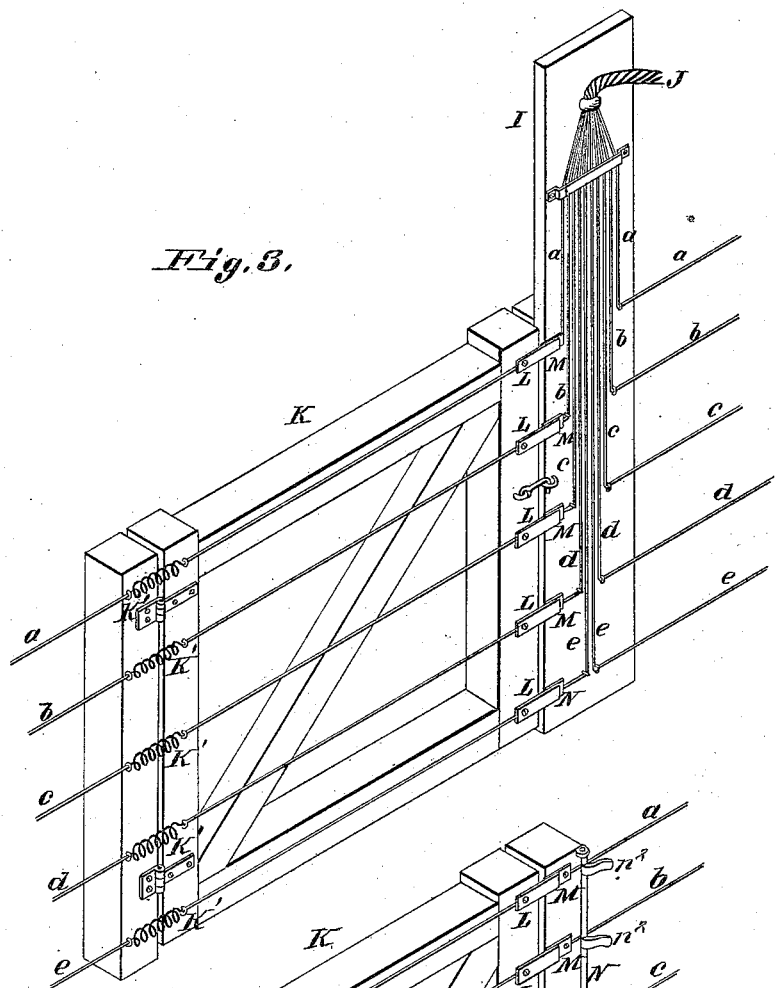
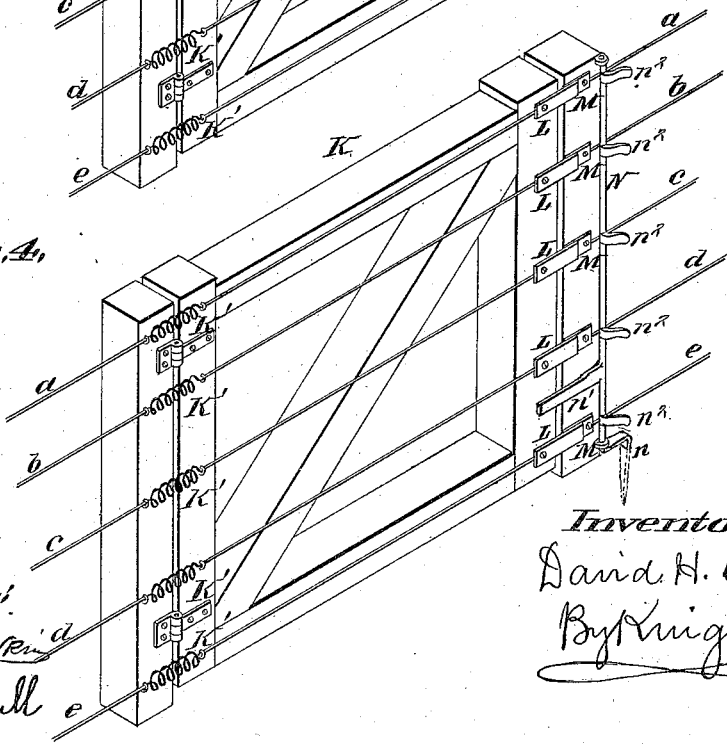

UNITED STATES PATENT OFFICE.

DAVID H. WILSON, OF ST. LOUIS, MISSOURI, ASSIGNOR OF ONE-THIRD TO DENT G. TUTT, OF SAME PLACE.

ELECTRIC FENCE.

SPECIFICATION forming part of Letters Patent No. 343,939, dated June 15, 1886.

Application filed October 12, 1885. Serial No. 179,687. (No model.)

*To all whom it may concern:*

Be it known that I, DAVID H. WILSON, of the city of St. Louis, in the State of Missouri, have invented a certain new and useful Improvement in Electric Fences, &c., of which the following is a full, clear, and exact description, reference being had to the accompanying drawings, forming part of this specification.

In this improvement the fence is composed of rods or wires insulated from the earth, supported on any suitable posts, and with the whole or any number of the wires kept charged with electricity by means of a generator driven by wind, water, or other power. The wires have separate connection with points on an indicator or switch-board, and have connection with each other in such a manner that a break in the fence can be located by means of the indicator or switch-board.

Figure 1 is a perspective view illustrating the invention. Fig. 2 is a view of a switch-board arranged for use in this connection. Figs. 3 and 4 are enlarged perspective views of fence-gates used in this connection.

A is a magneto-electric generator, which may be driven by any motor, such as a windmill, water-wheel, or steam-engine.

B B' is the ground-wire, (or wire communicating from the generator to the earth.)

C is a wire extending from the generator to the binding-post D of an electric bell, E.

G is a wire extending from the other post, F, of electric bell to a wire of the fence, and as all or as many of the wires as desired are connected together, these wires are all constantly charged with electricity, and in the event of any of them becoming broken, so as to make contact with the ground, the electric circuit is completed from the fence through the earth to wire B', the generator and wire C to the electric bell, and wire G to the fence. The closing of the circuit causes the bell to sound. In case the circuit has been established by the contact of an animal with the fence, the animal is shocked and scared away, and will soon learn to keep out of contact with the fence. As soon as the animal is out of contact with the fence, the circuit is broken and the alarm-bell E ceases to sound. It will of course be understood that the fence-wires are uncovered, so that an electric shock is given to an animal touching any part of the fence.

To enable the location of the break in the fence to be discovered, I provide an indicator or switch-board and connection, which will be now described. The indicator-board H has a number of sockets fitted to receive conducting-plugs $B^2$ and $G'$ at the ends of the wires B and G, respectively. There are two sockets in the board for each wire in the fence, each end of the wire being in connection with one of the sockets, in such a manner that when the plugs $B^2$ and $G'$ are put into the proper sockets the wires B and G may be thrown into electric connection with the opposite ends of the same fence-wire, (respectively,) and an electric current will be established through that wire, if it is not broken, and the alarm-bell will ring; but if the wire has been broken the circuit cannot be established, and the bell will not sound. I have lettered the ground-wire of the generator B B', because it is in two pieces, the piece B being directly connected to the generator, and the piece B' having ground-connection at one end, and at the other end connection with the indicator at a socket, $B^3$, into which the plug $B^2$ fits to form electric connection between the parts B and B'. Thus it will be seen that when the plug is taken from socket $B^3$ there is no connection between the generator and the earth.

The fence is shown with five wires insulated from the ground, and lettered, respectively, $a$, $b$, $c$, $d$, and $e$, with their opposite ends carried, respectively, to the sockets $a'$ $a^2$ $b'$ $b^2$, &c., of the indicator or switch-board, the ends of wire $a$ being in connection with sockets $a'$ $a^2$, wire $b$ in connection with sockets $b'$ $b^2$, and so on with the other wires, (as $e$ with sockets $e'$ $e^2$.) To test wire $a$ plug $G'$ is placed in socket $a'$ and plug $B^2$ in socket $a^2$, (or vice versa.) To test the condition of wire $c$ these plugs are put into sockets $c'$ $c^2$, respectively, and so with any of the wires. I is a post extended upward to give support to the upwardly-extending ends of wires $a$ $b$, &c., and these wires may be insulated from each other and extend in a cable, J, to the indicator or switch-board H, which may be located at a distance from the fence. In order to make continuous connection at the gates K, I twist the wires into coils K' at the hinges, so that they will be flexible and extensible, and at the free end of gate I make contact by plates L and M, which are attached to the gate and post, respectively, and which are in contact when the gate is closed, the opening of the gate of course breaking the circuit. The plates L should be elastic, so as to insure contact with those M, (or vice versa.)

In order to give alarm when a gate is opened, I form a ground-connection at the gate by means of a rod, N, which has constant ground-connection, $n$, but is insulated from the fence-wires when the gate is closed, but thrown into connection with these wires by the opening of the gate. This may be done in a variety of ways. As represented in Fig. 4, the rod has a side projection, $n'$, with which the gate comes in contact when opening, and by which the rod is turned in its bearings and the contact spring or springs $n^2$ brought in contact with the fence-wires. It will be seen that when this ground-connection is made the alarm-bell is sounded in the same manner as if an animal had touched the fence and made ground-connection, as before described.

In order to discover at what part of the fence a gate has been opened or one or more of the wires broken, the wires are connected together at certain places, substantially as will be now described. The fence is divided into sections by stations, as S S' $S^2$ $S^3$. At station S the top wire, $a$, is connected to the next wire, $b$, by a wire, $s$. At station S' the connection is between wires $a$ and $c$, at station $S^2$ between $a$ and $d$, and at station $S^3$ between $a$ and $e$, the other wires being out of connection at these stations. Now suppose the alarm-bell has sounded sufficiently long to indicate that a gate has been opened or the fence broken down at some point, and it is desired to discover between what stations the break or opening may be, and it is desired to locate the position of the open gate or break: this may be done in almost all cases by means of the upper wire, $a$, that one being most liable to accident. The position of an open gate and the method of procedure will be given in connection with the wire, though the method may be applied in much the same manner to locate breaks on the other wires. The plugs G' and $B^2$ are respectively placed in the sockets $a'$ and $b'$, and if the connection is perfect from the point of beginning to the first station, S, the bell will ring, as the current will be established along wire $a$ to the station, down connecting-wire $s$ to wire $b$, and back to the plug in socket $b'$. Now the plug may be changed from socket $b'$ to socket $c'$, and if the top wire is down between stations S and S' the bell will not sound, whereas if the wire is intact between these stations the current will be established along wires $a$ and $c$ and connecting-wire $s'$. In testing the fence between sections S' and $S^2$ the plug is removed from socket $c$ to socket $d$. In testing between stations $S^2$ and $S^3$ the plug is removed from socket $d$ and placed in $e$, and in testing between $S^3$ and the place of beginning the plugs are placed, respectively, in sockets $a^2$ and $e^2$, and the current, if the wires $a$ and $e$ are perfect, passes around by these wires and the wires $s^3$, connecting them. When the connections are in the normal position, the wires B and B' are in connection by the plug $B^2$, and the wire G is connected with the fence-wires by the insertion of the plug G' in any of the sockets in the indicator or switch-board with which the fence-wires connect, the plug being shown inserted in socket $a'$.

I will not describe the switch-board shown in Fig. 2, and which is a substantial equivalent of the indicator shown in Fig. 1, being used for the same purpose. The letters in this figure will sufficiently indicate the parts which occur in both the indicator and switch-board. The connection between the generator-wire B and wire G with the ground-wire B' and the fence-wires is made by means of switch G' and $B^2$, in place of plugs, the switches turning on pivots P and P', which pivots are in contact with the wires B and G, respectively, and are fitted to be put in connection with the other wires by turning on their pivots. The ends of the fence-wires in this figure (2) are indicated by the same letters as the sockets with which these same ends are connected in Fig. 1.

The manner of working the switches in connection with the wires is precisely the same as the manner of operating with the plugs for the same purpose hereinbefore described, the switches being used to form connection between the wires B and G and the fence-wires as a mere substitute for the plugs attached to the flexible ends of wires B and G.

I claim herein as new and of my invention—

1. In a wire fence, the combination of a magneto-electric generator, a circuit composed of a wire leading from one pole of the generator and connected with an electric bell mounted on a switch-board, a switch, G G', connected with said bell, a switch, B $B^2$, leading from the other pole of the generator, two series of sockets in the switch-board, one series for each switch, and the fence-wires, each of which wires leads to a socket in each series, the circuit being established by said switches and sockets, and short switch-wires crossing said fence-wires, substantially as described, and for the purpose set forth.

2. The combination of two or more fence-wires insulated from the earth, whose ends terminate at an indicator-board, with devices by which the fence-wires can be put in an electric circuit, and short switch wire or wires, as $s\ s'$, &c., connecting the fence-wires together, substantially as and for the purpose set forth.

3. The combination of the fence-wires, an indicator to which the ends of the wires are connected, and by which they are insulated from each other, a device for connecting the two ends of the same wire or of different wires in the same electric current, switch-wires connecting the wires together between their ends, and gates in the fence forming a continuous connection with the wires when closed, but breaking the circuit when open.

4. In a fence having insulated wires charged with electricity, and gates therein, and connected with an electric bell and generator, substantially as set forth, of a ground-connection thrown into the circuit by the opening of the gate, substantially as and for the purpose set forth.

5. In a fence having insulated wires charged with electricity, gates therein which, when opened, make a ground-connection through rods pivoted in projections in the gate posts, and springs formed in the fence-wires for closing said gates when released, as and for the purpose set forth.

6. In a fence having insulated wires charged with electricity, and gates therein, rods pivoted to the gate-posts, having projections $n'$ impinging against said gates, and springs $n^2$, the said gates when opened bringing said springs in contact with the fence-wires, making a ground-connection, as and for the purpose set forth.

DAVID H. WILSON.

Witnesses:
SAML. KNIGHT,
BENJN. A. KNIGHT.